United States Patent
Kooiman et al.

(10) Patent No.: US 10,793,285 B2
(45) Date of Patent: Oct. 6, 2020

(54) FUSELAGE EMBEDDED FUEL TANK

(71) Applicant: Bell Helicopter Textron Inc., Fort Worth, TX (US)

(72) Inventors: James Everett Kooiman, Fort Worth, TX (US); Greg Alan Whittaker, Mansfield, TX (US); Bryan Keith Sugg, Midlothian, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 230 days.

(21) Appl. No.: 15/895,619

(22) Filed: Feb. 13, 2018

(65) Prior Publication Data

US 2020/0156803 A1  May 21, 2020

(51) Int. Cl.
*B64D 37/04* (2006.01)
*B64C 1/06* (2006.01)
*B64C 39/02* (2006.01)

(52) U.S. Cl.
CPC ............. *B64D 37/04* (2013.01); *B64C 1/061* (2013.01); *B64C 39/024* (2013.01); *B64C 2201/021* (2013.01); *B64C 2201/024* (2013.01)

(58) Field of Classification Search
CPC ......... B64D 37/02; B64D 37/04; B64D 37/06
USPC .................................................... 244/135 R
See application file for complete search history.

(56) References Cited

U.S. PATENT DOCUMENTS

| | | | |
|---|---|---|---|
| 2,090,059 A * | 8/1937 | McClane | B64D 37/04 248/580 |
| 3,979,005 A | 9/1976 | Robinson et al. | |
| 6,123,295 A * | 9/2000 | Wexler | B64C 1/0009 244/172.3 |
| 10,279,921 B2 * | 5/2019 | Simpson | B64D 37/06 |
| 2013/0105628 A1 | 5/2013 | Buscher et al. | |
| 2014/0000917 A1 * | 1/2014 | Stupakis | A62C 3/0242 169/53 |
| 2014/0197277 A1 | 7/2014 | Otto | |

(Continued)

FOREIGN PATENT DOCUMENTS

| | | |
|---|---|---|
| CN | 101462594 B | 10/2010 |
| DE | 102014107316 A1 | 11/2015 |
| GB | 2522080 B | 7/2015 |

(Continued)

OTHER PUBLICATIONS

EPO Examination Report issue in EP Patent Application No. 18210894.4 dated Jul. 12, 2019, 6 pages.

(Continued)

*Primary Examiner* — Timothy D Collins
*Assistant Examiner* — Carlos A Rodriguez Larrotta
(74) *Attorney, Agent, or Firm* — Patent Capital Group

(57) ABSTRACT

One embodiment is a system comprising fuel tank comprising a pressure vessel for storing fuel for a vehicle, the fuel tank disposed within a fuselage of the vehicle and extending a majority of a length of the fuselage, wherein a center of gravity of the fuel tank is substantially aligned with a center of gravity of the fuselage. The fuel tank may be disposed within the fuselage such that the fuel tank bears at least a portion of a load borne by the fuselage. Alternatively, the fuel tank may be disposed within the fuselage such that the fuel tank is isolated from loads borne by the fuselage. In certain embodiments, the fuel tank comprises a filament wound pressure vessel.

19 Claims, 8 Drawing Sheets

(56) References Cited

U.S. PATENT DOCUMENTS

2015/0210162 A1  7/2015 Albert et al.
2015/0336680 A1* 11/2015 Schumacher ............. F17C 3/00
                                                244/135 B

FOREIGN PATENT DOCUMENTS

| JP | 2017140865 A | 8/2017 | |
| WO | 2013167637 A1 | 11/2013 | |
| WO | 2014149060 A1 | 9/2014 | |
| WO | WO-2014149060 A1 * | 9/2014 | ....... B60K 15/03006 |

OTHER PUBLICATIONS

Robertson Fuel Systems, "AS350 / EC130 Crash-Resistant Fuel Tank (CRFT)," Copyright © 2017, 1 page; http://www.robertsonfuelsystems.com/wp-content/uploads/2018/01/AS350-CRFT-Web-2018.pdf.

EPO Search Report issue in EP Patent Application No. 18210894.4 dated Jun. 26, 2019, 5 pages.

EPO Examination Report issue in EP Patent Application No. 18210894.4 dated Jan. 24, 2020, 5 pages.

* cited by examiner

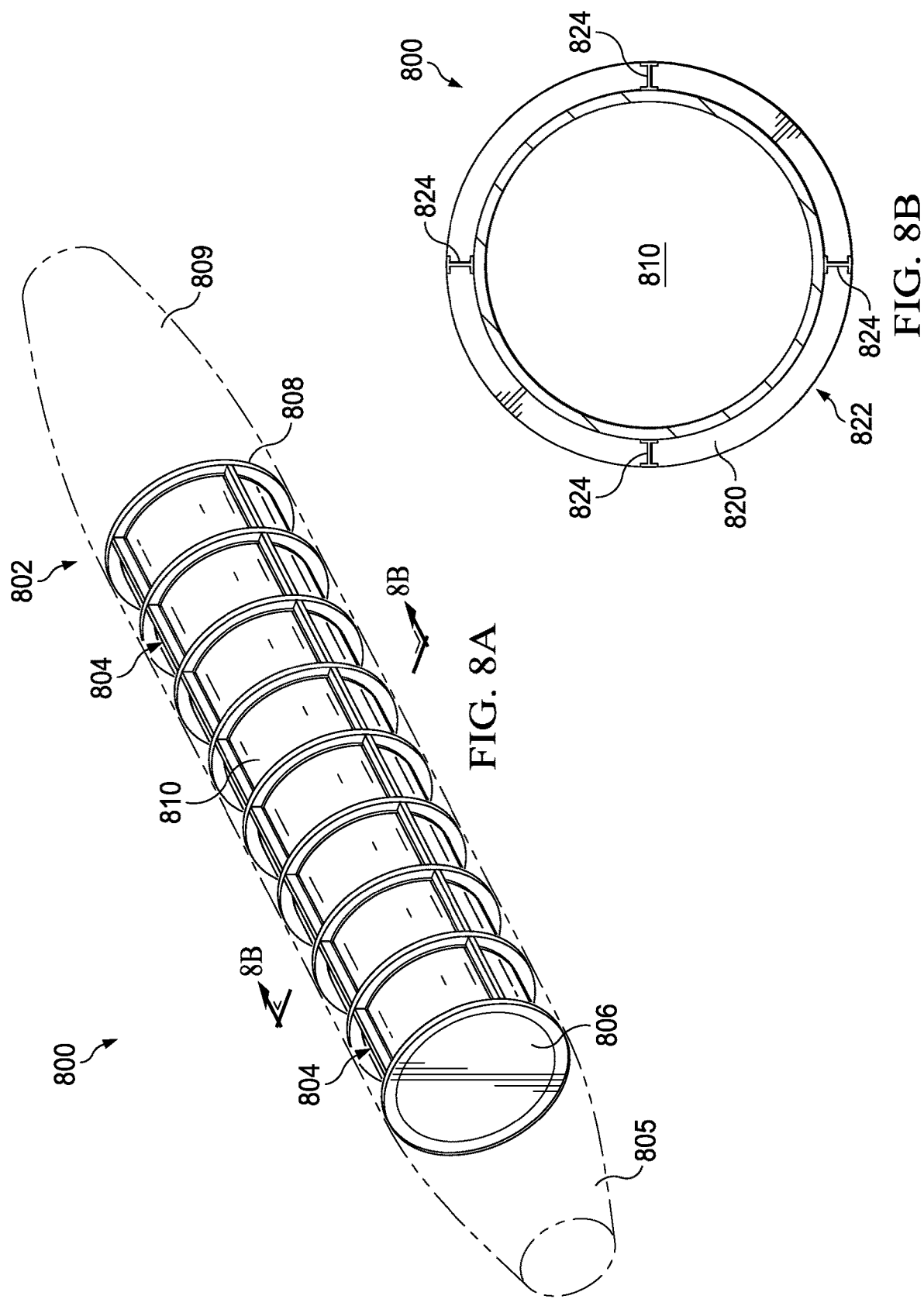

FUSELAGE EMBEDDED FUEL TANK

TECHNICAL FIELD

This disclosure relates in general to the field of aircraft and, more particularly, though not exclusively, to a fuel tank designed to be embedded in the fuselage of an aircraft.

BACKGROUND

A fuel tank is generally defined as a safe container for holding flammable fluids (e.g., fuel). The term fuel tank is typically applied to the part of an engine system in which fuel is stored and from which it is propelled or released into the engine. Fuel tanks range in size and complexity depending on the particular application and purpose for which they are designed. At a minimum, a fuel tank should provide for storage of a given amount of fuel in a manner that prevents leakage and evaporative emissions. A fuel tank should also be fillable in a safe manner, provide for a method of determining an amount of fuel remaining in the tank, be vented, and provide means by which the fuel may be propelled or released into the engine of the vehicle in which it is disposed.

SUMMARY

According to one aspect of the present disclosure, one embodiment is a system comprising fuel tank comprising a pressure vessel for storing fuel for a vehicle, the fuel tank disposed within a fuselage of the vehicle and extending a majority of a length of the fuselage, wherein a center of gravity of the fuel tank is substantially aligned with a center of gravity of the fuselage. The fuel tank may be disposed within the fuselage such that the fuel tank bears at least a portion of a load borne by the fuselage. Alternatively, the fuel tank may be disposed within the fuselage such that the fuel tank is isolated from loads borne by the fuselage. In certain embodiments, the fuel tank comprises a filament wound pressure vessel.

The fuselage may include a number of load-bearing frame members, wherein the fuel tank is supported within the fuselage by the frame members. A rubber member may be disposed on an inner surface of each one of the frame members for supporting a bottom of the tank. In certain embodiments, the fuel tank may include at least one C-channel around a circumference thereof, the system further comprising a strap disposed within the C-channel, the strap having a first end attached to a first one of the frame members on a first side of the fuel tank and a second end attached to the first one of the frame members on a second side of the fuel tank. At least one of the first and second ends of the strap may be removably attached to the first one of the frame members. Additionally, a bottom portion of the first one of the frame members may be received within a portion of the C-channel disposed along a bottom portion of the fuel tank. In some embodiments, the vehicle is an unmanned aerial vehicle ("UAV").

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIG. 8A is an isometric view of a fuselage-embedded fuel tank system in accordance with certain embodiments described herein.

FIG. 8B is a cross-sectional view of the fuselage-embedded fuel tank system of FIG. 8A at a line 8B-8B.

DETAILED DESCRIPTION

Figure 1A:
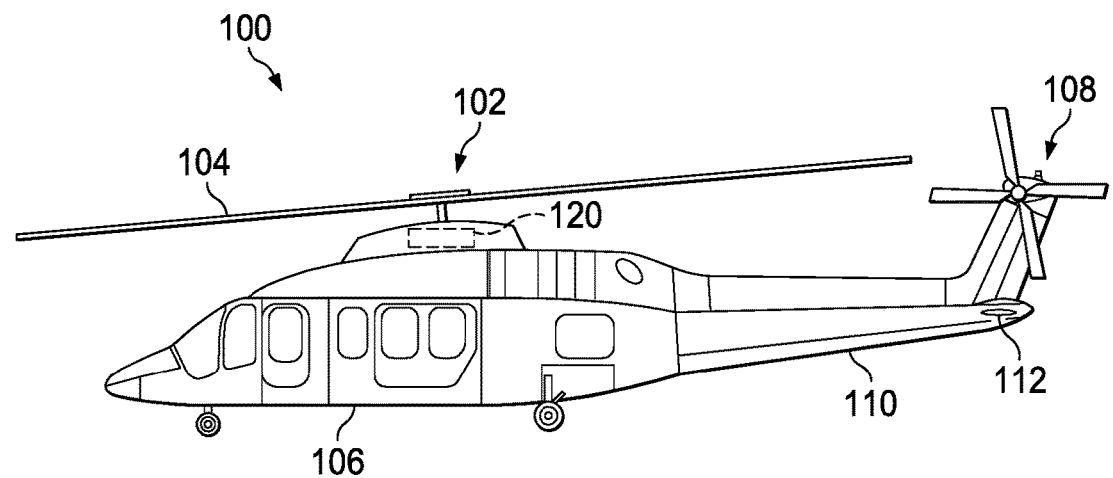
FIGS. 1A-1B are simplified schematic diagrams of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom' or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
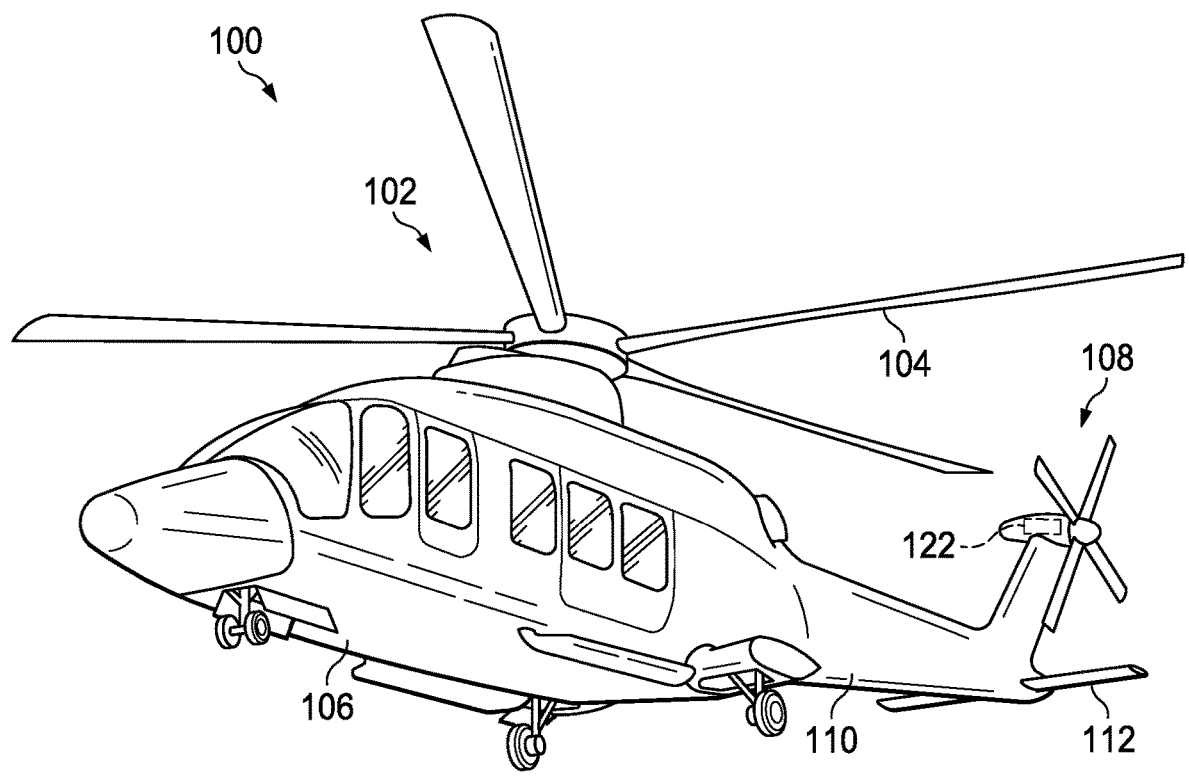

FIGS. 1A-1B illustrate an example embodiment of a rotorcraft 100. FIG. 1A portrays a side view of rotorcraft 100, while FIG. 1B portrays an isometric view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, tail structure 112 may be used as a horizontal stabilizer. Torque is supplied to rotor system 102 and anti-torque system 108 using at least one engine and at least one gearbox. At least one gearbox 120 associated with rotor system 102 is illustrated in the embodiment of FIG. 1A. In some embodiments, anti-torque system 108 may also include an associated at least one gearbox 122, as illustrated in the embodiment of FIG. 1B.

Figure 2:
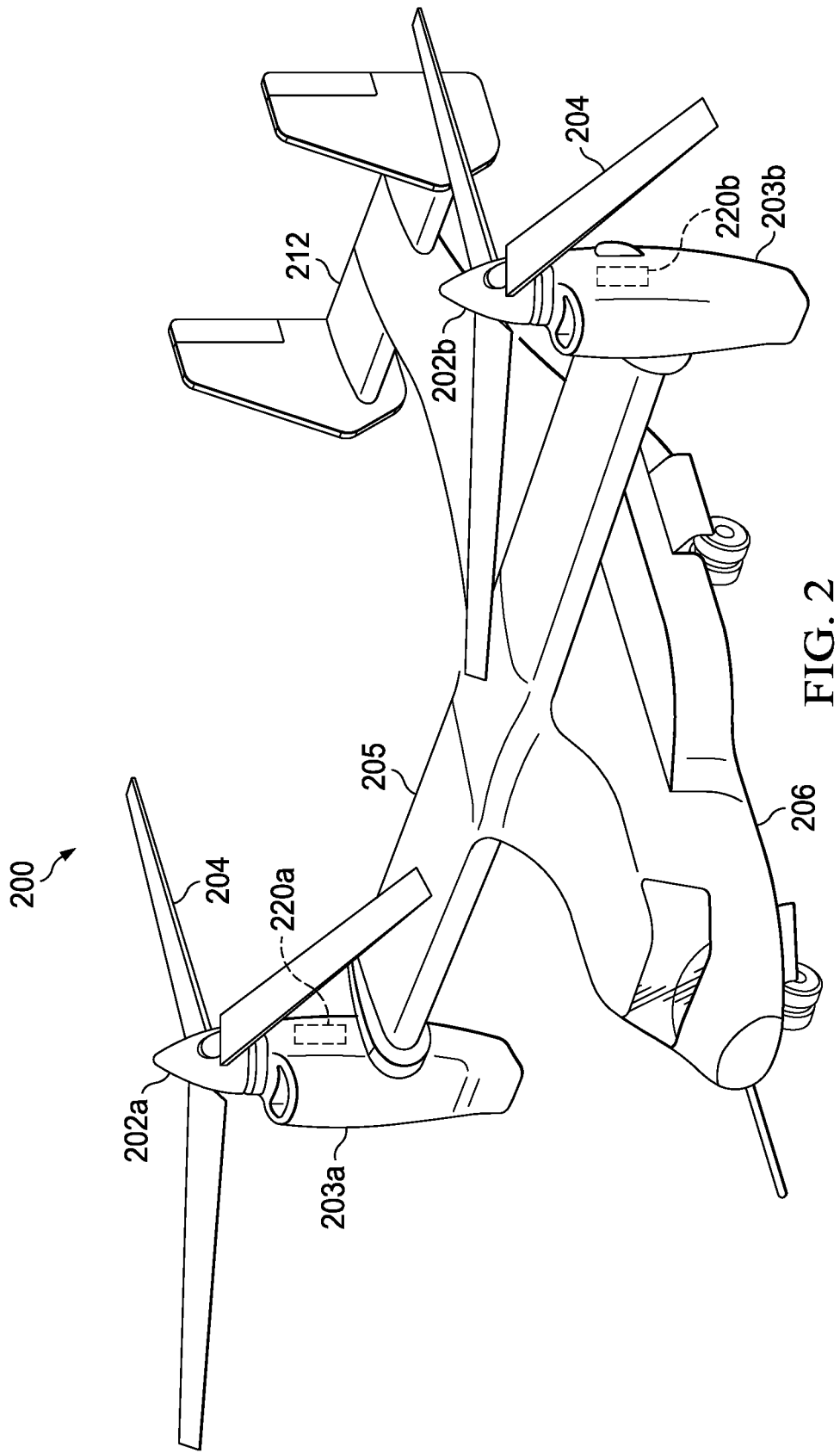
FIG. 2 is a simplified schematic diagram of another example aircraft, in accordance with certain embodiments.

FIG. 2 illustrates a perspective view of an example tiltrotor aircraft 200. Tiltrotor aircraft 200 includes nacelles 203a and 203b, a wing 205, a fuselage 206, and a tail structure 212. Nacelles 203a and 203b respectively include rotor systems 202a and 202b, and each rotor system 202a and 202b includes a plurality of rotor blades 204. Moreover, each nacelle 203a and 203b may include an engine and at least one gearbox 220a and 220b, respectively, for driving rotor systems 202a and 202b, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, tail structure 212 may be used as a vertical stabilizer.

It should be appreciated that rotorcraft 100 of FIGS. 1A-1B and tiltrotor aircraft 200 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

As the name implies, unmanned aerial vehicles ("UAVs"), or drones, are aircraft that do not have a human pilot aboard. Together, a UAV, a ground-based controller, and a system of communications between the two constitutes an unmanned aircraft system ("UAS"). UAVs may operate under remote control by a human operator or autonomously under the control of an onboard computer system. While UAVs were originally primarily designed for military applications, their use has expanded to other applications, such as surveillance, product delivery, aerial photography, and myriad other commercial, scientific, and recreational purposes. A UAV may be designed to be expendable or recoverable and to carry lethal or non-lethal payloads.

Because UAVs are by definition unmanned, a generous portion of the fuselage volume may be devoted to fuel tanks. Embodiments described herein consolidate fuel into fewer, larger tanks near the aircraft center of gravity, rather than employing many small tanks distributed throughout the aircraft, thereby reducing fuel system components and minimizing boundaries between non-fuel and fuel-filled volumes, which are often heavy to ensure a fuel-tight seal. Embodiments further contain fuel in an inherently stiff structure, such as a pressure vessel, thereby to handle pressure differentials between the fuel system and the rest of the aircraft in a weight efficient manner. In contrast, fuel tanks with flat structure as fuel boundaries can carry a significant weight penalty as material is added to increase out-of-plane stiffness.

Particular embodiments include a fuselage structural layout that leverages a large central pressure vessel fuel tank. In some embodiments (e.g., FIGS. 3A-3B and 8A-8B), the fuel tank is configured as a load-bearing member; in other embodiments (e.g., FIGS. 4-7B), the fuel tank is isolated and not load-bearing. The structural arrangement is essentially a tube within a tube, with the outer tube comprising an outer mold line ("OML") of the aircraft fuselage and the inner tube comprising the fuel tank. Load bearing structural elements such as frames, beams, and stringers are disposed between the inner and outer tubes as required to react loads on the aircraft.

Figure 3A:
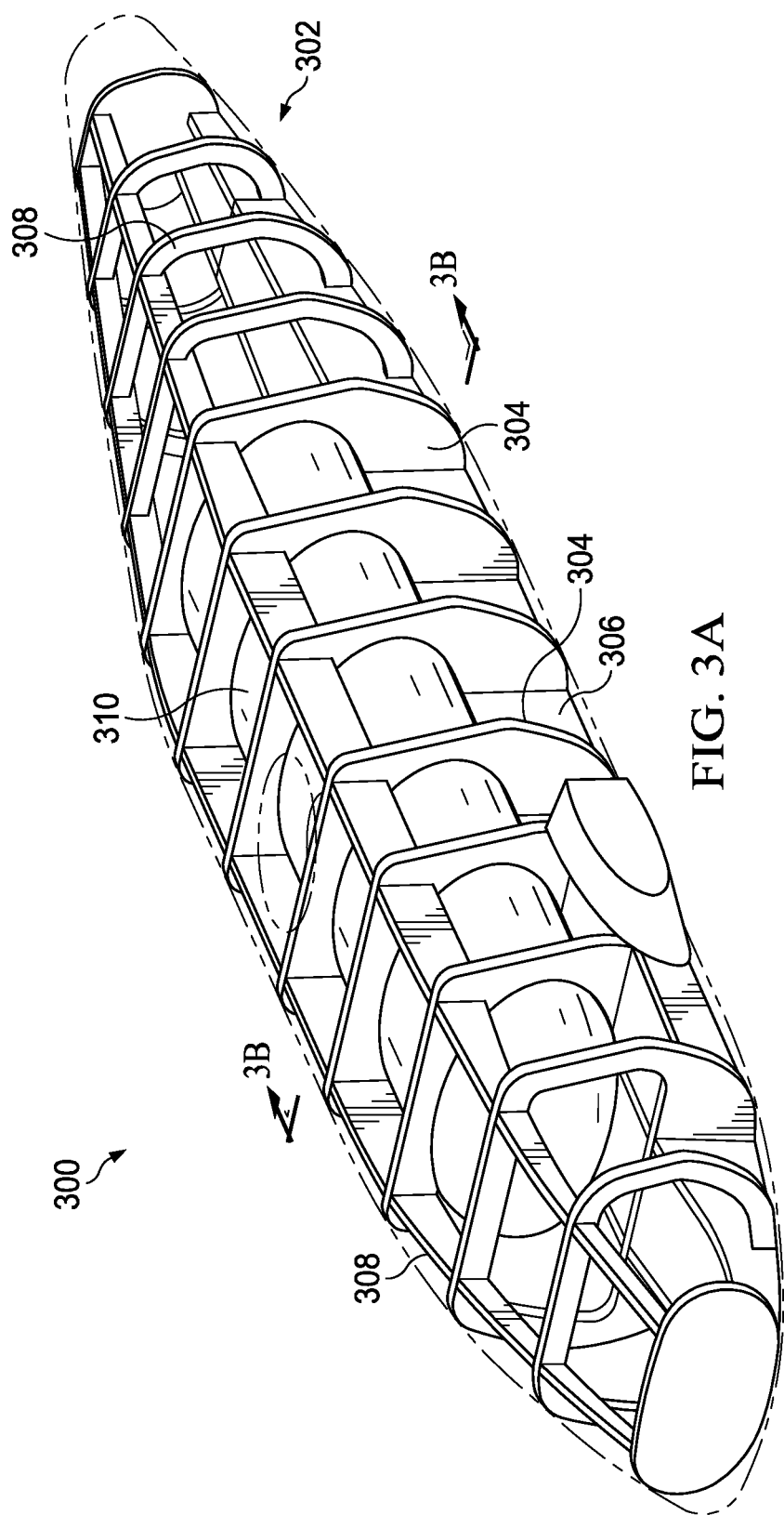
FIG. 3A is an isometric view of a fuselage-embedded fuel tank system in accordance with certain embodiments described herein.

FIG. 3A is an isometric view of a fuselage-embedded fuel tank system 300 in accordance with certain embodiments described herein. As shown in FIG. 3A, the system 300 includes an aircraft fuselage 302 including a plurality of frame members 304, a pair of keel beams 306 (only one of which is visible in FIG. 3A, but the other of which is disposed on the opposite side of fuselage 302), and a pair of roof beams 308. The system 300 further includes an embedded fuel tank 310. As shown in FIG. 3A, the frame members 304 are connected at opposite sides of top portions thereof to the roof beams 308 and at opposite sides of bottom portions thereof to the keel beams 306. The frame members 304 surround and provide support for the fuel tank 310, as described in greater detail below.

Figure 3B:
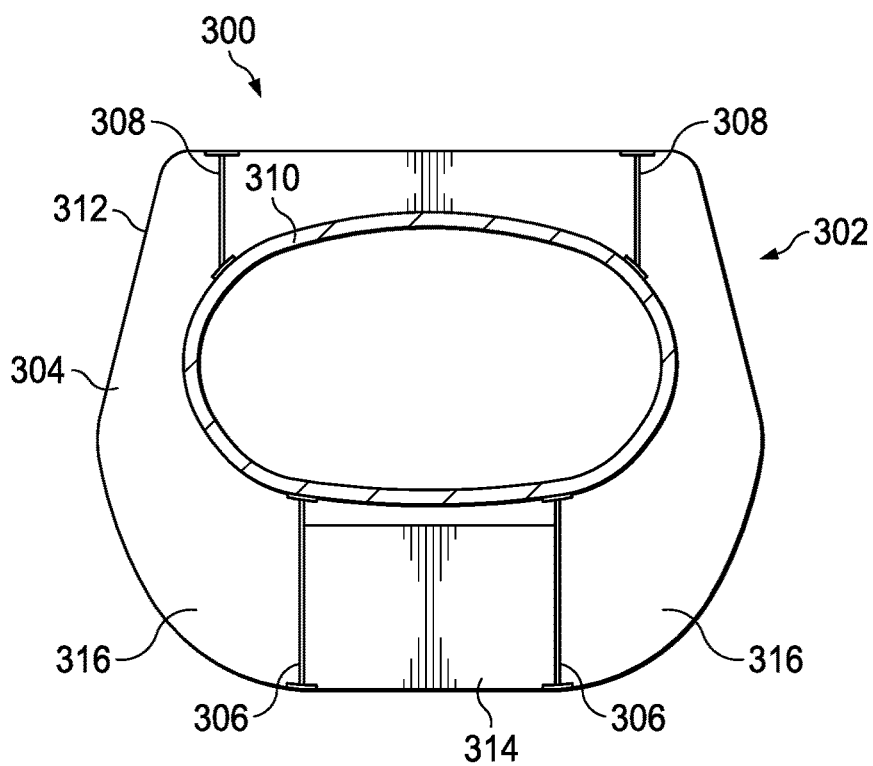
FIG. 3B is a cross-sectional view of the fuselage-embedded fuel tank system of FIG. 3A at a line 3B-3B.

FIG. 3B is a cross-sectional view of the system 300 of FIG. 3A at a line 3B-3B. In addition to the elements shown in FIG. 3A (i.e., fuselage 302, frame member 304, keel beams 306, roof beams 308, and fuel tank 310), also shown in FIG. 3B is the fuselage OML 312 and a payload bay area 314 disposed beneath the fuel tank 310 and the bottom of the frame members 304 that support the fuel tank. In certain embodiments, the bottom of the payload bay 314 includes doors at the OML 312 through which munitions may be dropped when the doors are open. A section of the frame at the top of the payload bay may act as a load path from the left to right hand frames. As shown in FIG. 3B, frame members 304 extend between the fuselage OML 312 and fuel tank 310. In some embodiments, aircraft mechanical and electrical systems routing equipment (e.g., cables, wires, etc.) may be disposed in and routed through areas 316 below and outboard the fuel tank 310. Additionally and/or alternatively, such systems routing equipment may be disposed above the fuel tank 310 at the center of the fuselage 302.

In accordance with features of certain embodiments described herein, the fuel tank 310 is positioned within the fuselage 302 such that the center of gravity of the fuel tank 310 is substantially aligned with the center of gravity of the aircraft such that, as the tank 310 is gradually depleted of fuel during a flight, the center of gravity of the tank, and hence the aircraft, remains substantially unaffected. Those of ordinary skill in the art would appreciate that a consistent aircraft center of gravity is a benefit to stability and control because deflections of control surfaces to trim the aircraft remain consistent as fuel is burned. This simplifies flight controls, control surface sizing, and may eliminate the need for a complex fuel management system to manage aircraft center of gravity during flight.

Figure 4:
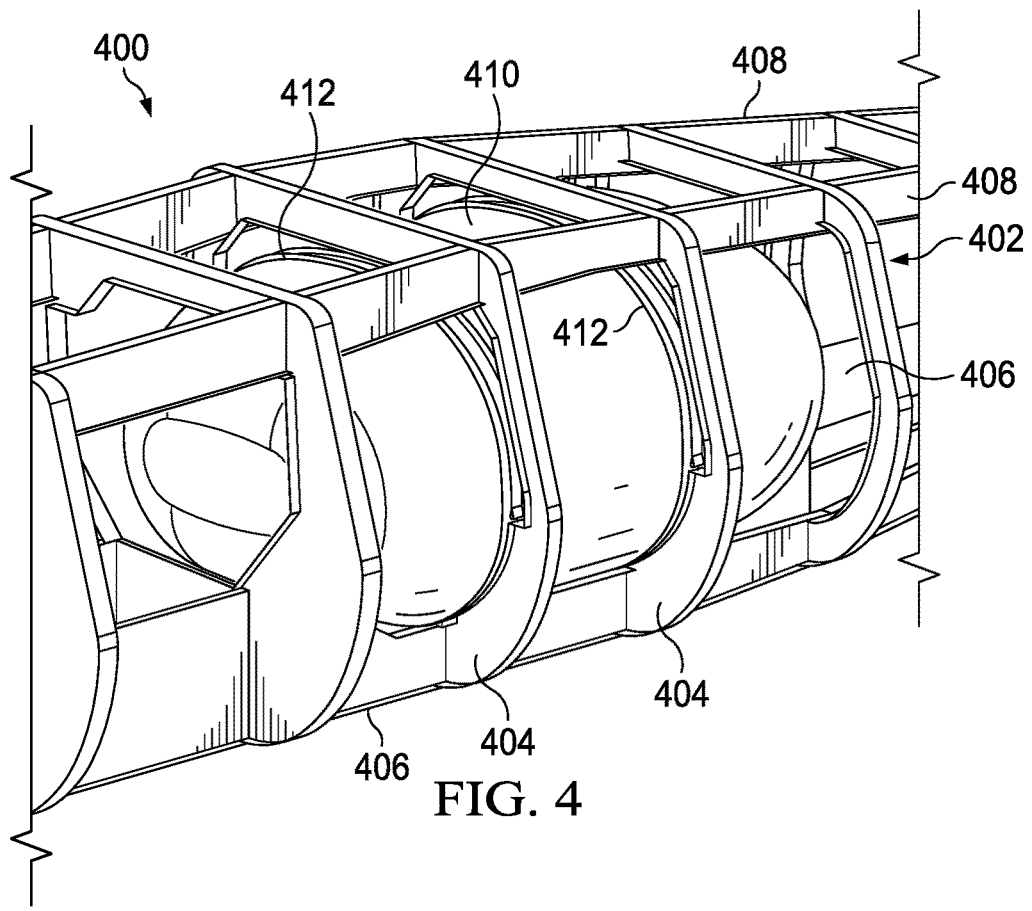
FIG. 4 is an isometric view of a fuselage-embedded fuel tank system in accordance with certain embodiments described herein.

FIG. 4 illustrates a partial isometric view of another fuselage-embedded fuel tank system 400 in accordance with embodiments described herein. As shown in FIG. 4, the system 400 includes an aircraft fuselage 402 including a plurality of frame members 404, a pair of keel beams, such as keel beam 406, and a pair of roof beams 408. In the embodiment illustrated in FIG. 4, a fuel tank 410 is secured within the fuselage 402 by straps 412 that extend from one side of a respective frame member 404 to the other side of the same frame member over the top of fuel tank 410. The bottom of the fuel tank 410 is supported, or cradled, by the bottom portion of the frame members 404, as will be described in greater detail below. The straps 412 may be constructed of nylon, cotton, or other type of webbing, for example.

Figure 5A:
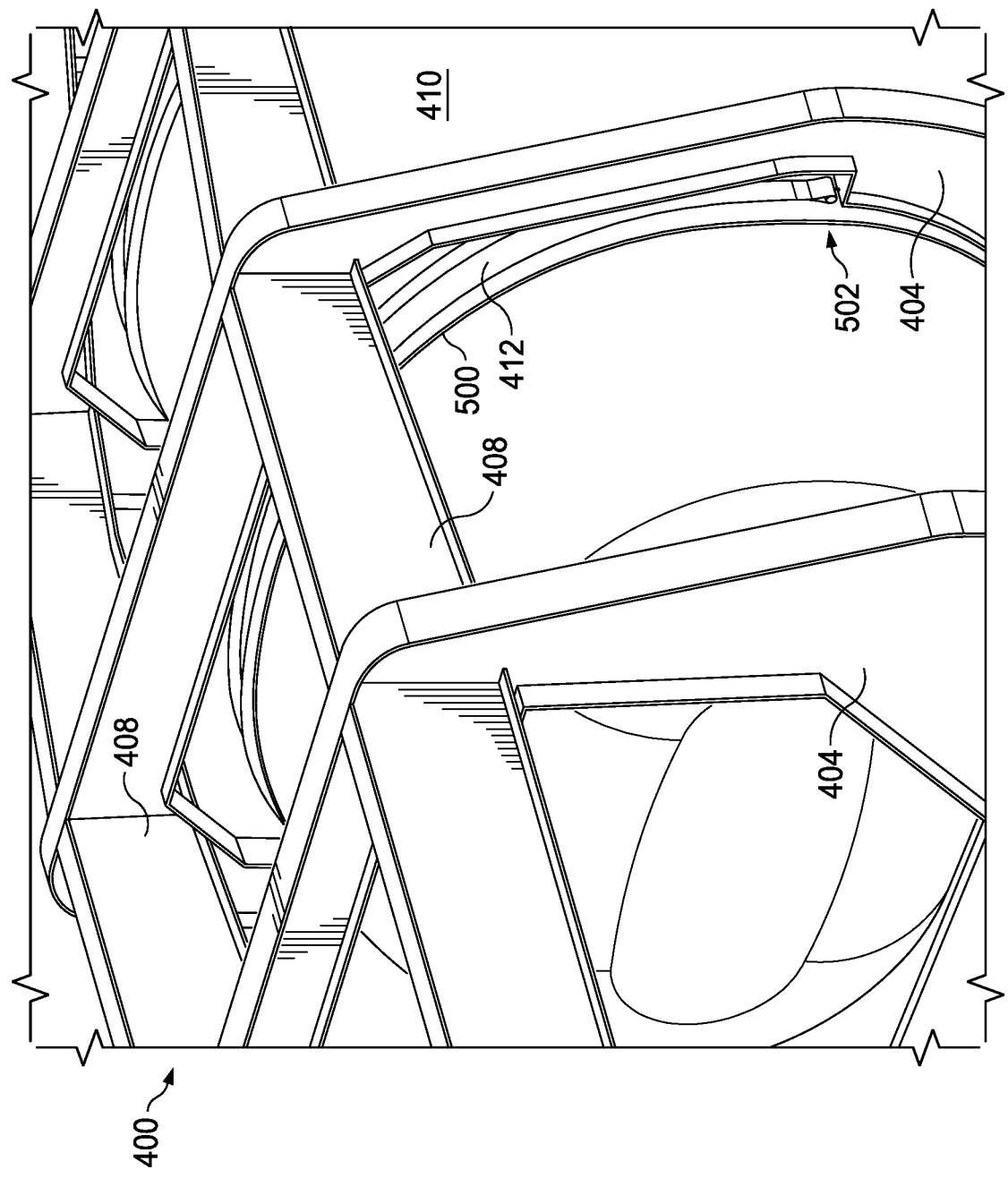
FIG. 5A is a more detailed view of a portion of the fuselage-embedded fuel tank system of FIG. 4.
Figure 5B:
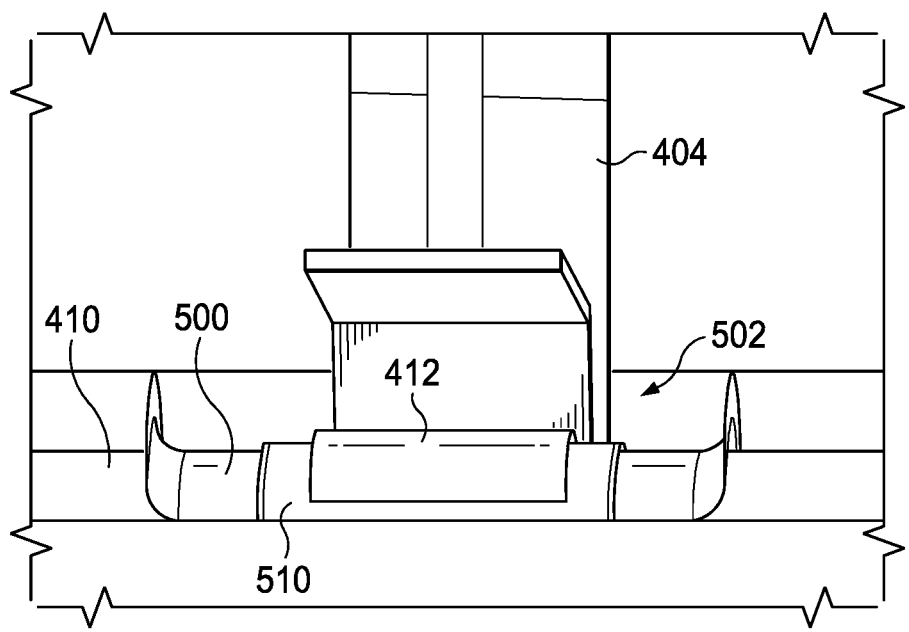
FIG. 5B is a more detailed view of an embodiment of a strap attachment mechanism of the fuselage-embedded fuel tank system of FIG. 4.

Referring now to FIG. 5A, illustrated therein is a more detailed view of a portion of the system 400. As shown in FIG. 5A, the fuel tank 410 includes a plurality of C-channels, such as a channel 500, each of which aligns with a respective frame member 404 such that the corresponding strap 412 may be connected to one side of the frame member 404 via an attachment mechanism 502 and lie within the C-channel over and across the top of the tank 410 and attached on the other side of the tank to the opposite side of the frame member in a similar and/or corresponding fashion. In certain embodiments, the interior surface of each of the C-channels 500 may be reinforced to add stiffness to the tank underneath the strap 412. Additionally, the C-channels 500 add stiffness to the tank to prevent the tank from deflecting substantially when the strap 412 is tightened. A purpose of the C-channels 500 is to prevent fore and aft movement of the strap 412 along the surface of the fuel tank 410 over which it extends, thereby providing additional security for the fuel tank 410. FIG. 5B illustrates a more detailed view of the strap attachment mechanism 502. As illustrated in FIG. 5B, a rubber member 510 may be provided within each of the C-channels 500, which extends around the bottom portion of the fuel tank 410 for providing extra cushioning of the tank against the frame member 404, as will be shown and described in greater detail below. It will be recognized that the members 510 may be constructed of a cushioning material other than rubber in various embodiments. A variety of mechanisms may be used to implement the strap attachment mechanism 502, including, but not limited to, a ladder lock, a cinch lock, a tri glide, a custom bracket or mount, a buckle system, and a hook. It will be noted that different mechanisms may be deployed on opposite sides of the tank/member, with one side being a more permanent attachment structure and the other providing a releasable and/or adjustable structure, thereby to enable the fuel tank 410 to be easily removed from and installed in the fuselage 402.

Figure 6:
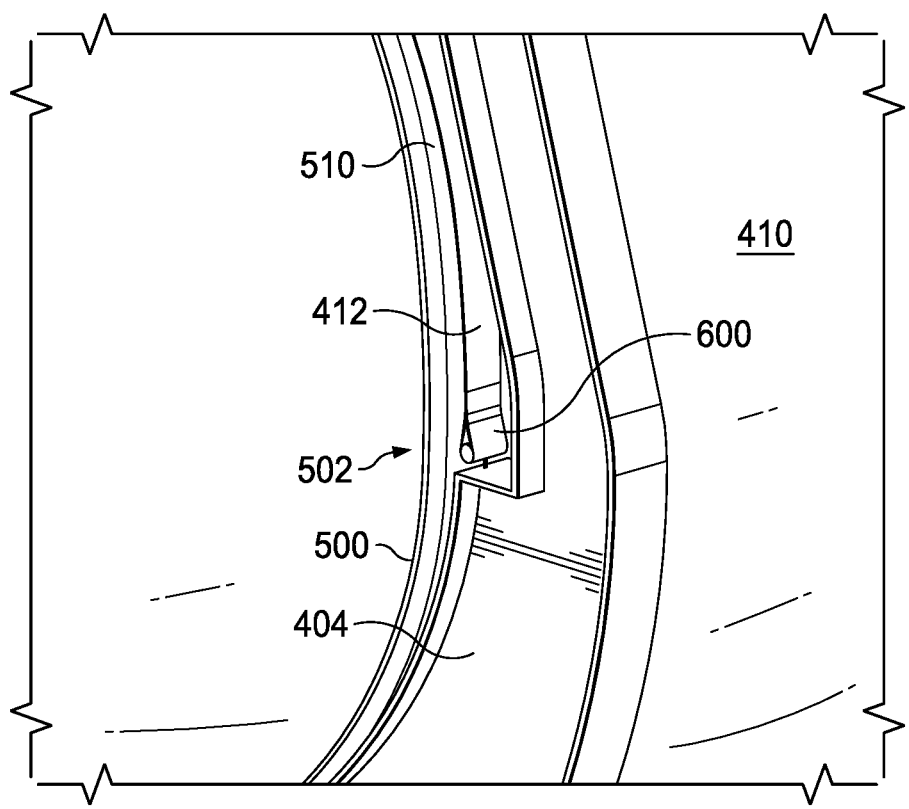
FIG. 6 is a more detailed view of another portion of the fuselage-embedded fuel tank system of FIG. 4.

FIG. 6 is a more detailed view of a portion of the system 400. As shown in FIG. 6, each of the frame members 404 is configured such that the bottom portion of the frame member may rest within the corresponding C-channel 500 along the bottom portion of the tank 410. The rubber member 510 provides additional cushioning for the fuel tank 410 where the tank is in contact with the frame member 404. A slight clearance may be provided between the frame 404 and the tank 410 along the top portion of the tank over which the strap 412 is disposed to allow for the tank to be installed. Additionally, as the top of the tank 410 is held in place by the straps 412, there is no need for the frames 404 to be in contact with the upper side of the tank.

Figure 7A:
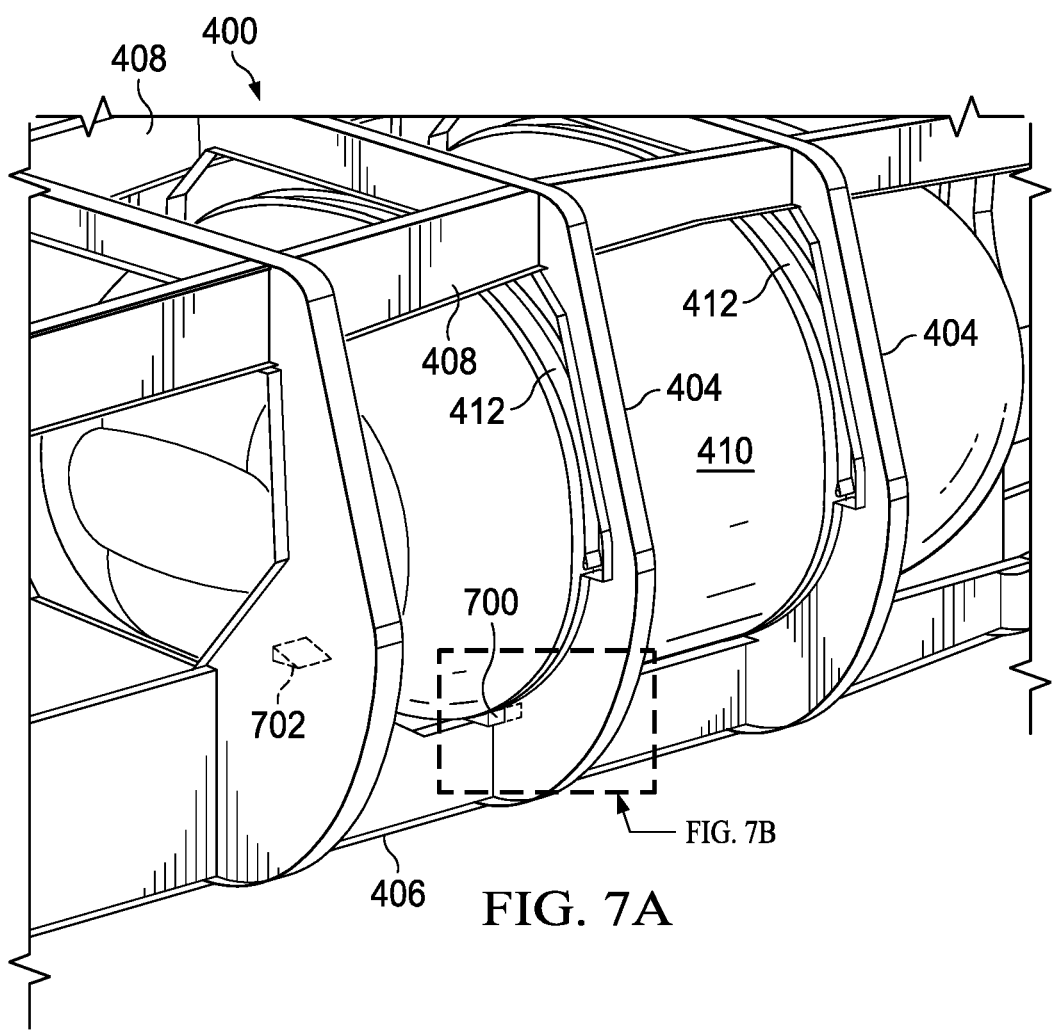
FIGS. 7A and 7B illustrate more detailed views of an embodiment of a fore-aft restraint mechanism of the fuselage-embedded fuel tank system of FIG. 4.
Figure 7B:
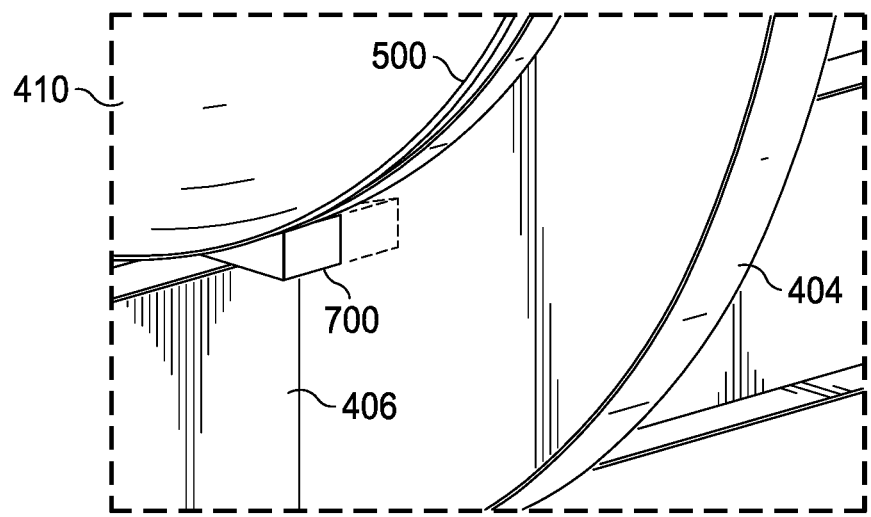

Although the combination of the C-channel 500, straps 412, and frame members 404 operate to provide some restraint of fore and aft movement of the fuel tank 410 within the fuselage 402, it will be recognized that a primary purpose of the combination is to prevent up and down movement of the fuel tank 410. Therefore, it may be beneficial in some embodiments to provide additional restraints to further secure the fuel tank 410 and prevent fore-aft movement. Referring now to FIGS. 7A and 7B, illustrated therein is a portion of the system 400 showing a fore-aft restraint 700 for further restraining fore and aft shifting of the fuel tank 410 within the fuselage 402, especially during flight. As shown in FIGS. 7A and 7B, the fore-aft restraint 700 includes a block attached to the keel beam 406 recessed inside of the C-channel 500 in a manner that inhibits fore-aft movement of the tank 410. Although not shown, it will be recognized that a corresponding restraint may be disposed on the opposite side of the tank 410 in the same manner. Additionally, multiple such restraints may be disposed along the length of the fuel tank 410 at each C-channel 500 on one or both sides of the tank 410. Other embodiments of fore-aft restraints may include vertical fasteners disposed between the beam and the tank 410 and a strut between the beam and tank in the fore-aft direction.

It will be noted that either the roof beam or the keel beam may be used to provide a fore-aft load path; however, the keel beam is more likely to be used to provide such a load path, since the strap is not in the way at that location. Because the tank already has additional structure at the strap location, the fore-aft restraint may be located there as well. A variety of different embodiments may be used to implement fore-aft restraint. For example, the restraint may be implemented using a fitting with a stud projecting vertically downward from the tank and in alignment with a hole in a cap of the keel beams on the left- and right-hand sides. Alternatively, instead of a stud, the tank could have a fitting with a threaded insert or nut plate and a bolt could be installed through a hole in the keel beam cap and into the threaded fitting on the left- and right-hand sides. Still further, instead of a single bolt on each side, there could be multiple bolts installed into a fitting located at the C-channel on the left- and right-hand sides.

A strut, like the fasteners, may be provided on both the left- and right-hand sides of the tank. As with the fasteners, the keel beam is more likely than the roof beam to be used to provide the load path, since the strap is not in the way. A fitting should be provided on the tank for the strut to connect to. The extra structure provided by the C-channel makes it a likely location for the strut. The fittings may be disposed directly above the keel beam, with clearance between the top of the keel beam and the bottom of the tank so that there is enough room for the strut to pass through. A corresponding fitting may be provided on the top of the keel beam, either fore or aft of the one on the tank. The strut may be bolted to each of the fittings.

FIGS. 8A and 8B illustrate simplified views of an alternative embodiment of a fuselage-embedded fuel tank system 800 in accordance with embodiments described herein. Unlike the embodiment shown in FIGS. 3A and 3B, the fuselage is simplified to a round shape and does not contain added features such as a payload bay. As shown in FIG. 8, the system 800 includes a fuselage 802 including a number of frame members 804, pressure bulkheads 806, 808. FIG. 8B is a cross-sectional view of the system 800 shown in FIG.

8A. As shown in FIG. 8A, the fuel tank 810 includes an inner skin (i.e., fuel tank wall) 820, and an outer skin 822 (i.e., fuselage skin) separated by a frame member 804. A plurality of longerons 824 are provided as necessary. In accordance with features of embodiments described herein, the longerons and frames can take any form; their design is driven by what is needed to react to loads on the aircraft. Additionally, the elements tie the OML skin to the fuel tank skin, forcing the two pieces of structure to function together to carry the load. The space between the tank and the OML is used to route systems, as described above.

In certain embodiments, the fuel tank may be filament wound as one large part or multiple individual parts, thus saving on additional fasteners at wet-dry boundaries. In certain embodiments, the fuel tank may be filament wound in the same manner in which composite fuselage sections are wound. In particular, a large mandrel holding a tool spins and the composite (e.g., carbon) fiber is wound around it. At a splice between two sections of the tank, a strap may be disposed that runs around the outside and is fastened to both sections with two or more rows of fasteners on each side of the joint.

Embodiments described herein make lightning strike less of a concern, as the fuel tank can be isolated from the outer skin of the fuselage. The single fuel tank consolidates a large volume of fuel into one tank at center of gravity, adds stiffness to the fuselage and is inherently stiff for pressure loads, and renders system routing near fuselage OML more accessible.

It will be noted that in the embodiments illustrated in FIGS. 3A-3B and 8A-8B, the fuel tank is built into the fuselage structure and designed to be take loads (i.e., load-bearing), whereas in the embodiments illustrated in FIGS. 4-7B, the fuel tank is isolated from the fuselage structure and designed to react only to fuel loads. In each of the embodiments, the fuel tank may be positioned such that the center of gravity thereof is aligned with that of the fuselage, thereby providing the benefits outlined above.

The flowcharts and diagrams in the Figures illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A system comprising:
   a fuselage comprising a plurality of frame members disposed along a length of the fuselage, wherein each of the frame members extends from a first side of the fuselage to a second side of the fuselage and has a substantially U-shaped bottom portion;
   a fuel tank comprising a pressure vessel for storing fuel for a vehicle, the fuel tank disposed within a fuselage of the vehicle and extending a majority of an entire length and width of the fuselage, wherein a center of gravity of the fuel tank is substantially aligned with a center of gravity of the fuselage;

wherein the fuel tank comprises a plurality of C-channels around a circumference of the fuel tank and disposed along a length of the fuel tank, the system further comprising a plurality of straps, wherein each of the straps is disposed within a top portion of a corresponding one of the C-channels, each of the straps having a first end attached to a corresponding one of the frame members on a first side of the fuel tank and a second end attached to the corresponding one of the frame members on a second side of the fuel tank;

wherein the substantially U-shaped bottom portion of each of the frame members is received within a bottom portion of a corresponding one of the C-channels such that a bottom of the fuel tank is supported by the frame members.

2. The system of claim 1, wherein the fuel tank is disposed within the fuselage such that the fuel tank bears at least a portion of a load borne by the fuselage.

3. The system of claim 1, wherein the fuel tank is disposed within the fuselage such that the fuel tank is isolated from loads borne by the fuselage.

4. The system of claim 1, wherein the fuel tank comprises a filament wound pressure vessel.

5. The system of claim 1, wherein at least one of the first and second ends of the strap is removably attached to the first one of the frame members.

6. The system of claim 1 wherein the fuselage further comprises at least one fore-aft restraint for engaging at least one of the C-channels on a side of the fuel tank for inhibiting fore and aft movement of the fuel tank with respect to the fuselage.

7. The system of claim 1 wherein the vehicle comprises an unmanned aerial vehicle ("UAV").

8. The system of claim 1, wherein each of the frame members is a load-bearing frame member.

9. The system of claim 8 further comprising a rubber member disposed on an inner surface of each one of the frame members for supporting the bottom of the tank.

10. A rotorcraft comprising:
a fuselage comprising a plurality of frame members disposed along a length of the fuselage, wherein each of the frame members extends from a first side of the fuselage to a second side of the fuselage and has a substantially U-shaped bottom portion; and
a fuel system, the fuel system comprising:
a fuel tank comprising a pressure vessel for storing fuel for the rotorcraft, the fuel tank disposed within a fuselage of the vehicle and extending a majority of an entire length and width of the fuselage, wherein a center of gravity of the fuel tank is substantially aligned with a center of gravity of the fuselage;
wherein the fuel tank comprises a plurality of C-channels around a circumference of the fuel tank and disposed along a length of the fuel tank, the system further comprising a plurality of straps, wherein each of the straps is disposed within a top portion of a corresponding one of the C-channels, each of the straps having a first end attached to a corresponding one of the frame members on a first side of the fuel tank and a second end attached to the corresponding one of the frame members on a second side of the fuel tank;

wherein the substantially U-shaped bottom portion of each of the frame members is received within a bottom portion of a corresponding one of the C-channels such that a bottom of the fuel tank is supported by the frame members.

11. The rotorcraft of claim 10, wherein the fuel tank comprises a filament wound pressure vessel.

12. The rotorcraft of claim 10, wherein the fuselage comprises an unmanned aerial vehicle ("UAV") fuselage.

13. The rotorcraft of claim 10 wherein the fuselage further comprises at least one fore-aft restraint for engaging at least one of the C-channels on a side of the fuel tank for inhibiting fore and aft movement of the fuel tank with respect to the fuselage.

14. The rotorcraft of claim 10, wherein the frame members comprise load-bearing frame members.

15. The rotorcraft of claim 14, wherein the fuel system further comprises a rubber member disposed on an inner surface of each one of the frame members for supporting a bottom of the tank.

16. An unmanned aerial vehicle ("UAV") comprising:
an elongated fuselage comprising a plurality of frame members disposed along a length of the fuselage, wherein each of the frame members extends from a first side of the fuselage to a second side of the fuselage and has a substantially U-shaped bottom portion; and
a fuel system comprising:
a fuel tank comprising a pressure vessel for storing fuel for the UAV, the fuel tank disposed within a fuselage of the vehicle and extending a majority of an entire length and width of the fuselage, wherein a center of gravity of the fuel tank is substantially aligned with a center of gravity of the fuselage;
wherein the fuel tank comprises a plurality of C-channels around a circumference of the fuel tank and disposed along a length of the fuel tank, the system further comprising a plurality of straps, wherein each of the straps is disposed within a top portion of a corresponding one of the C-channels, each of the straps having a first end attached to a corresponding one of the frame members on a first side of the fuel tank and a second end attached to the corresponding one of the frame members on a second side of the fuel tank;
wherein the substantially U-shaped bottom portion of each of the frame members is received within a bottom portion of a corresponding one of the C-channels such that a bottom of the fuel tank is supported by the frame members.

17. The UAV of claim 16, wherein the fuel tank is disposed within the fuselage such that the fuel tank bears at least a portion of a load borne by the fuselage.

18. The UAV of claim 16, wherein the fuel tank is disposed within the fuselage such that the fuel tank is isolated from loads borne by the fuselage.

19. The UAV of claim 16 wherein the fuselage further comprises at least one fore-aft restraint for engaging at least one of the C-channels on a side of the fuel tank for inhibiting fore and aft movement of the fuel tank with respect to the fuselage.

* * * * *